J. C. ADAMS.
Corn-Planter.
No. 25,613.   Patented Oct. 4, 1859.
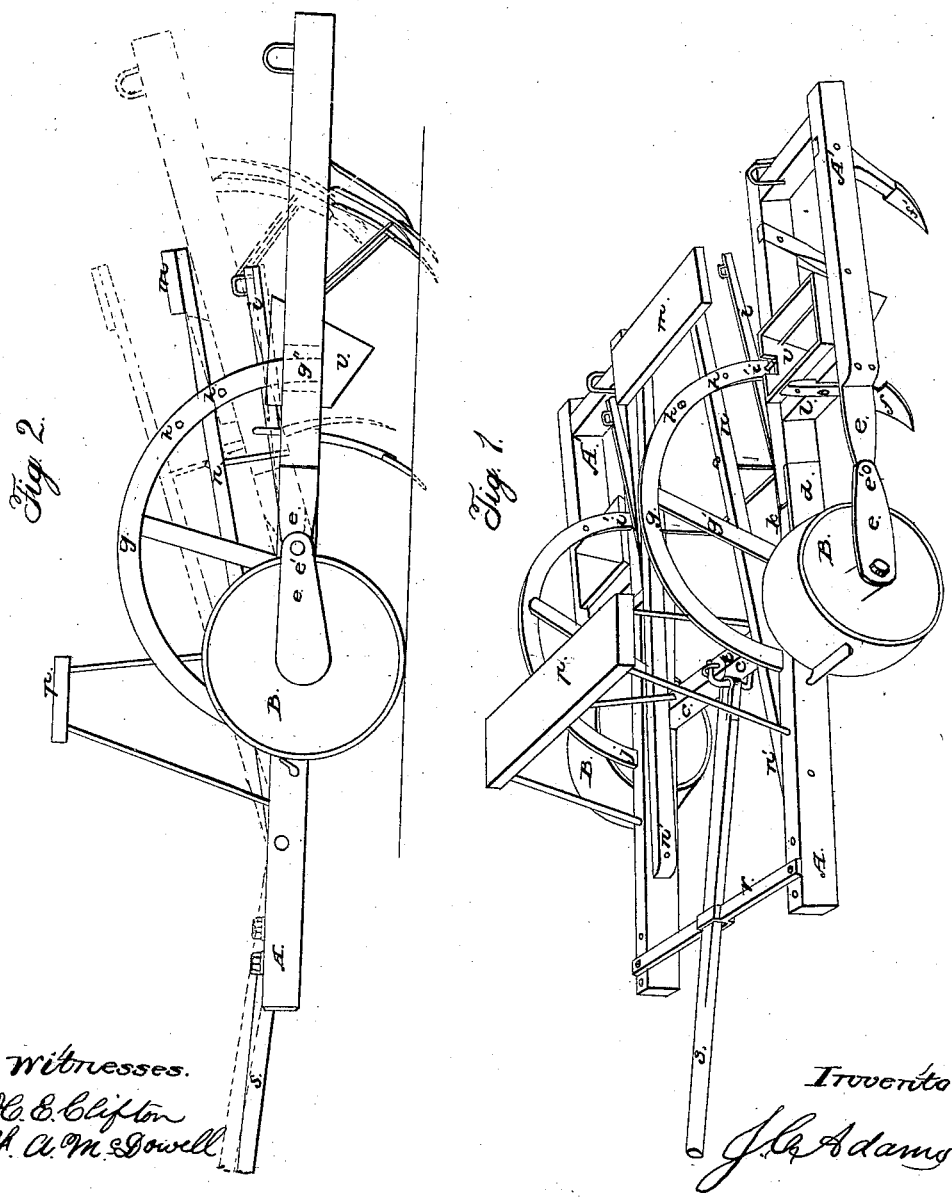

UNITED STATES PATENT OFFICE.

J. C. ADAMS, OF GREENSBURG, INDIANA.

IMPROVEMENT IN CORN-PLANTERS.

Specification forming part of Letters Patent No. 25,613, dated October 4, 1859.

*To all whom it may concern:*

Be it known that I, J. C. ADAMS, of Greensburg, in the county of Decatur and State of Indiana, have invented a new and useful Improvement in Corn-Planters; and I do hereby declare that the following is a full and clear description thereof, reference being had to the accompanying drawings, and to the letters of reference marked thereon and made to form a part of this specification.

The nature of the invention relates to the means used for controlling the depth of the plows in the ground.

In reference to the accompanying drawings, Figure 1 is a perspective view, showing the planter with all its working parts arranged for operation. Fig. 2 is a side elevation of the planter.

A A′ represent the frames of the planter, arranged upon two wheels, B, the part A of the frame being permanently attached to the axle-tree $c$, and the parts A′ or plow-frames being hinged to the frame A at $d$.

Attached to the plow-frames A′, and pivoted together at $e'$, are plates $e$, which extend forward to and are fitted upon the ends of the axle-tree $c$, by means of which an even draft is given to the plow-frames and their plows, and at the same time they are allowed a vertical motion, which adapts the plows to any inequality in the surface of the ground, or allows the said frames A′ to be elevated, so as to free the said plows from the ground when required.

Firmly secured to the frame A at $j$, provided with braces $g'$, and arranged to pass through mortises $g''$ of the frames A′ are semicircular supports $g$, having in them perforations $h$, and pivoted to the frames A′ at $k$ are springs $i$, provided with pins $i'$, which are adapted to the perforations $h$ of the supports $g$, so that by raising the frames A′ and inserting the pins $i'$ in the supports $g$ below said frames A′ said frames A′, together with their plows $f\ f'$, will be sustained entirely free from the ground, as shown clearly by the red lines in Fig. 2; and by inserting said pins $i'$, as aforesaid, above the frames A′, the plows $f\ f'$ may be confined to their proper depth in the ground, or allowed any desired degree of vertical motion.

$f$ are furrowing-plows, secured upon the cross-bars $l$ of the frames A′ in such manner as to be allowed vertical adjustment with reference to said bar $l$.

$f'$ are covering-plows firmly secured to the longitudinal timbers of the frames A′, as clearly shown in Fig. 1.

$m$ is the dropper's seat, attached to the spring-bars $n$. Said spring-bars $n$ are pivoted to the frame A at $n'$, and arranged in such manner as to rest upon the axle-tree $c$, so that the weight of the dropper bears upon the axle-tree, and at the same time the spring of the bars $n$ affords to the said dropper an easy and comfortable seat.

$p$ is a seat for the driver.

$r$ is an adjustable bar through which the pole $s$ passes.

$t$ is a notched clevis, by means of which the after end of the pole is secured to the axle-tree; and by means of the adjustable bar $r$, in combination with the clevis $t$, the pole $s$ may be so arranged and adjusted as to facilitate the operation of the plows $f\ f'$ with reference to their proper depth in the ground, and also with reference to the balancing of the weight of the operators and frame A upon the axle-tree $c$.

$v$ are hoppers or conductors through which the corn may be deposited upon the ground.

The operation of the planter may be described as follows: The dropper will sit upon the seat $m$, with a vessel containing the corn to be planted secured in front of his person in a convenient manner for use. The plows $f\ f'$ will be adjusted, as before described, to a proper depth in the ground. The planter will then be moved forward, and the dropper will drop the corn with both hands at the same time at the proper places of deposit. The ground may be cross-furrowed before planting by means of the plows $f$, so that the corn may be planted in check-rows, if desired.

Having fully described the construction and operation of my invention, what I claim as my invention, and desire to secure by Letters Patent, is—

The arrangement of the clevis device $t$ on the rear of the pole $s$, when said pole is received through the mortise in the bar, and when the said bar is made adjustable by means of bolts and bolt-holes through its ends, and through the frame-pieces A, said clevis device being made so as to clasp together cross-pieces $c$ and $c'$, all in the manner and for the purpose set forth.

In testimony of which invention I have hereunto set my hand.

J. C. ADAMS.

Witnesses:
H. E. CLIFTON,
F. A. McDOWELL.